(12) United States Patent
Bostick et al.

(10) Patent No.: US 10,410,523 B1
(45) Date of Patent: Sep. 10, 2019

(54) SYSTEM AND METHOD FOR HOLOGRAPHIC COMMUNICATIONS BETWEEN VEHICLES

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/979,622

(22) Filed: May 15, 2018

(51) Int. Cl.
*G08G 1/00* (2006.01)
*G08G 1/16* (2006.01)
*G01C 21/36* (2006.01)
*G06N 20/00* (2019.01)

(52) U.S. Cl.
CPC .......... *G08G 1/166* (2013.01); *G01C 21/367* (2013.01); *G06N 20/00* (2019.01)

(58) Field of Classification Search
CPC ............. G08G 1/166; G08G 1/096783; B60K 2350/2026; B60K 2350/965; G06F 3/0416; G06F 3/0412
USPC ....... 340/901, 903, 933, 935, 938, 939, 436, 340/435
See application file for complete search history.

(56) References Cited

U.S. PATENT DOCUMENTS

| 5,900,825 | A | 5/1999 | Pressel et al. |
| 7,620,494 | B1* | 11/2009 | Matthews ............... G01C 21/36 701/440 |
| 9,568,611 | B2 | 2/2017 | Cosatto et al. |
| 9,704,397 | B1 | 7/2017 | Bjorklund et al. |
| 2016/0144785 | A1* | 5/2016 | Shimizu .................. B60R 11/02 340/435 |
| 2017/0329143 | A1* | 11/2017 | Svarichevsky .......... G02B 5/32 |
| 2018/0229643 | A1* | 8/2018 | Frimpong ................ B60Q 1/00 |

FOREIGN PATENT DOCUMENTS

WO 2016202940 12/2016

* cited by examiner

*Primary Examiner* — Toan N Pham
(74) *Attorney, Agent, or Firm* — Schmeiser, Olsen & Watts, LLP; James Nock (57) ABSTRACT

The present invention provides a method and system for monitoring vehicle movement changes by analyzing, by a computing system, projected movement changes of a first vehicle traveling along a path in response to (A) the first vehicle path being predetermined and stored in a data storage of the computing system, or (B) navigation of the first vehicle path corresponding to contemporaneous actions by a driver of the first vehicle. The computing system transmits a hologram map of the roadway ahead, indicating a next projected movement change of the first vehicle in response to the analyzed projected movement changes of the first vehicle.

20 Claims, 5 Drawing Sheets

SYSTEM AND METHOD FOR HOLOGRAPHIC COMMUNICATIONS BETWEEN VEHICLES

TECHNICAL FIELD

The invention relates generally to the field of holographic communications for drivers of vehicles and between drivers of vehicles, such as automobiles, and particularly for transmitting holographic images for drivers to view which indicate projected vehicle movements.

BACKGROUND

Sometimes directional signals are not clearly visible to drivers of vehicles which, in turn, creates a safety problem that could result in a collision of the vehicles. Accordingly, there is a need for improved systems and methods to accurately display directional signals and precise movements to drivers of these vehicles.

SUMMARY

The present invention provides a method, and associated computer system and computer program product, for monitoring vehicle movement changes by analyzing, by a computing system, projected movement changes of a first vehicle traveling along a path in response to (A) the first vehicle path being predetermined and stored in a data storage of the computing system, or (B) navigation of the first vehicle path corresponding to contemporaneous actions by a driver of the first vehicle. The computing system/method transmits a hologram map of the roadway ahead, indicating a next projected movement change of the first vehicle in response to the analyzed projected movement changes of the first vehicle.

The computing system/method can also receive a signal from a second vehicle indicating a location and movements of the second vehicle, wherein the second vehicle is determined to be located within a proximate vicinity of the first vehicle. The location and movements of the second vehicle are analyzed along the path of the second vehicle in response to the received signal from the second vehicle, and transmitted via a holographic display for viewing by the driver of the first vehicle. The holographic display shows the roadway ahead, the path and projected movement changes of the first vehicle, as well as the location, movements and path of the second vehicle. A comparison is made between the location and the path of the second vehicle with the path and projected movement changes of the first vehicle. In response to the comparing step the computing system and method evaluates whether paths of the first vehicle and the second vehicle will intersect. A holographic warning is transmitted, in response to the evaluating step, of a projected intersection of paths of the first vehicle and the second vehicle for viewing by the driver of the first vehicle.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
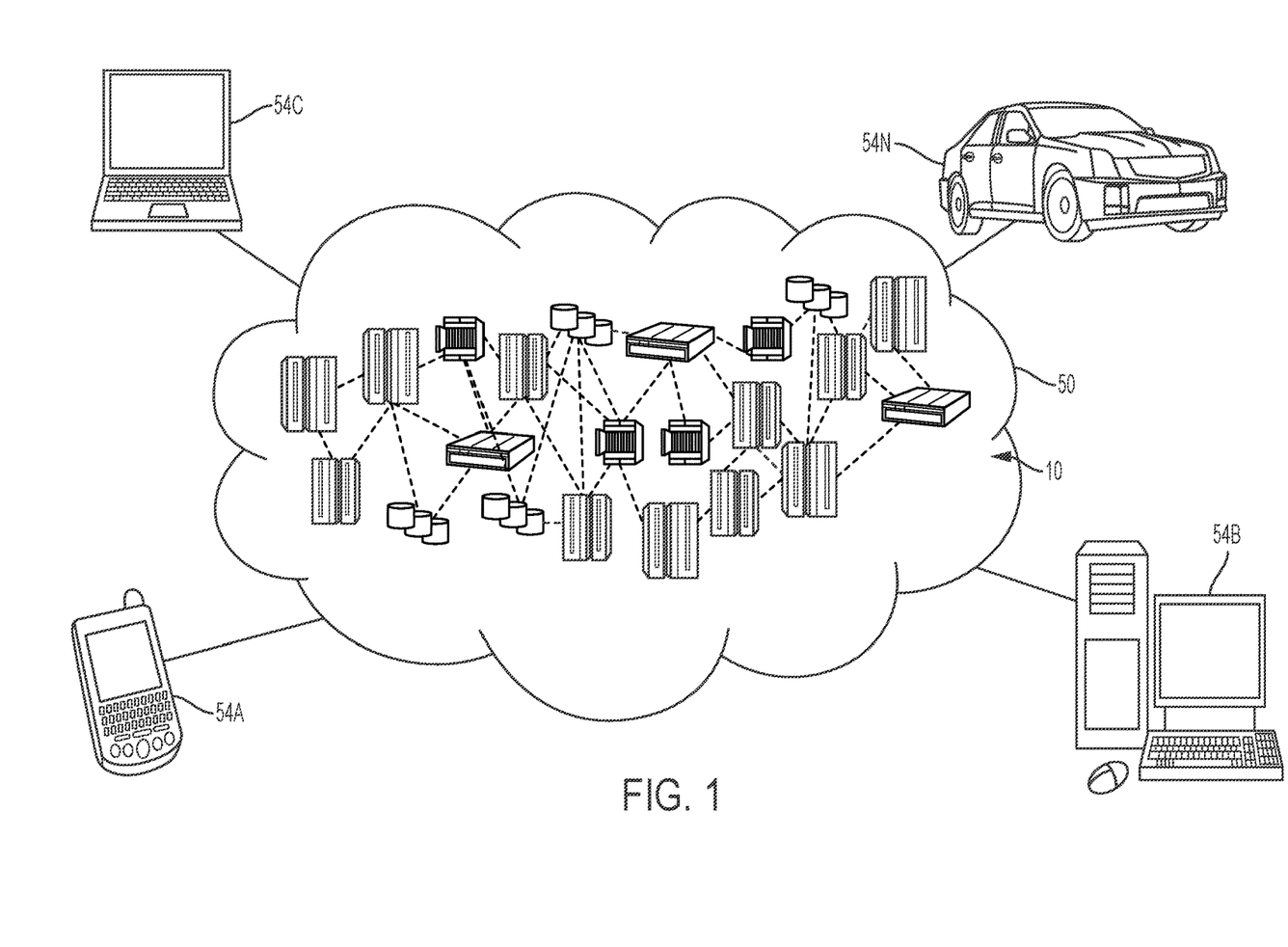
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
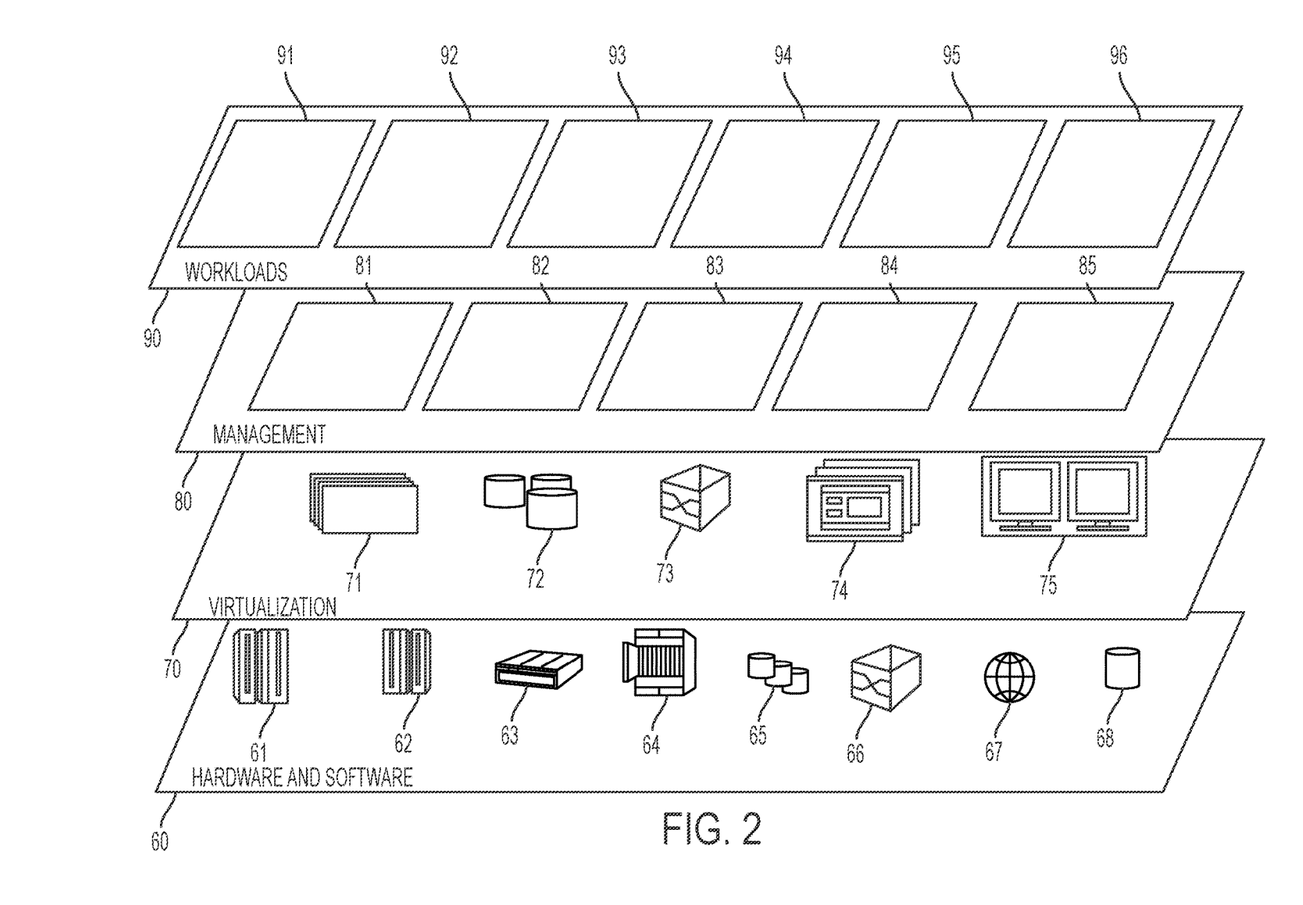
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and holographic vehicle communications 96.

The methods and systems of the present invention are particularly useful for holographic communications between vehicles by displaying holographic images of directional turn signals and other specific movements of a vehicle and all surrounding vehicles such as automobiles, trucks, motorcycles, boats, bicycles, skimobiles, trains, horse drawn carriages, horses with riders, or any other vehicle which is typically manned and controlled by a person.

Figure 3A:
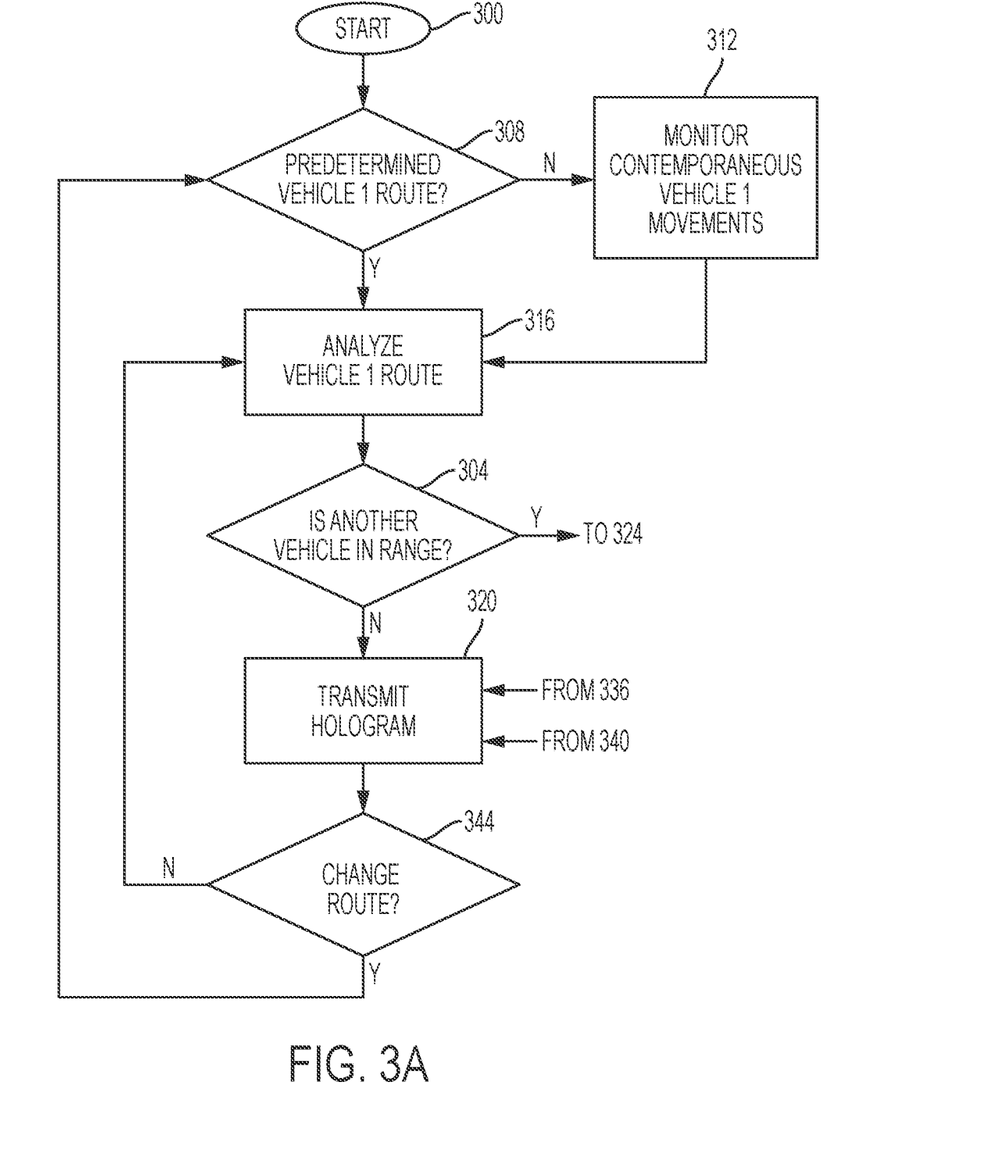
FIGS. 3A and 3B are flowchart diagrams of a method in accordance with embodiments of the present invention.
Figure 3B:
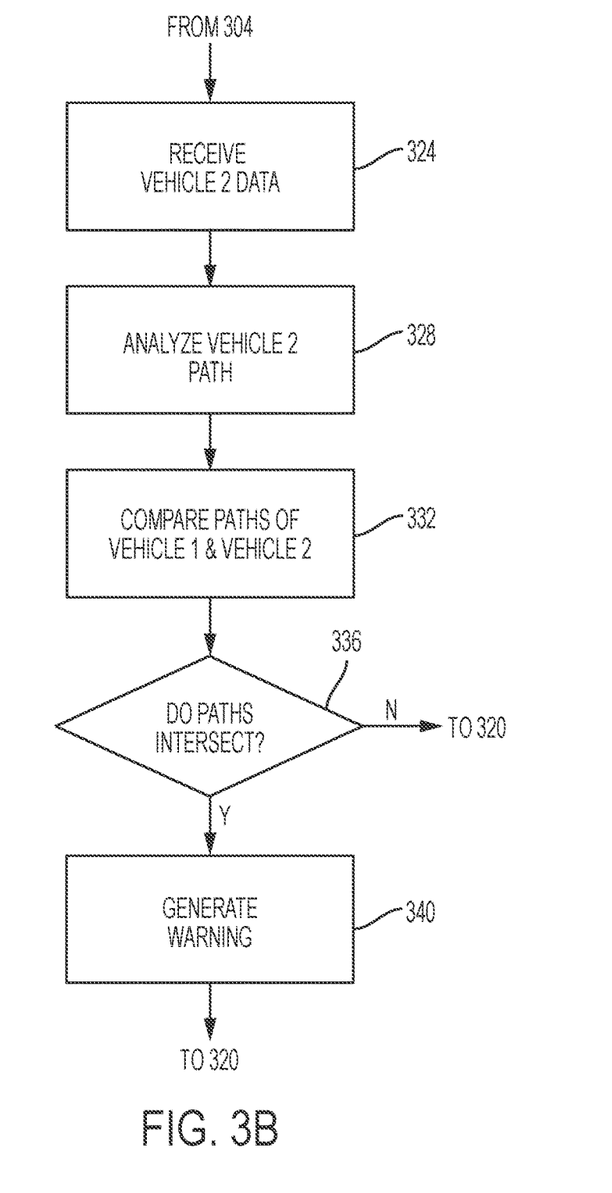

FIGS. 3A and 3B are flowchart diagrams of a method in accordance with embodiments of the present invention.

In FIG. 3A the method starts in step 300 when a driver Joe enters his vehicle (hereinafter referred to as "vehicle 1"), such as his car, and starts the car which in turn will initialize data of the holographic vehicle communications system and method built into a computing system within the car. During step 300 initialization the driver Joe will be prompted to enter a destination via an input device which could accept a verbal command, or an input via a keypad or graphic display, or via any other known input/selection device or method.

Notably the holographic vehicle communications system will have access to the onboard vehicle mapping system such as a global positioning GPS mapping system.

Step 308 determines whether a predetermined route as stored in the database is selected by Joe to travel to his destination. If Joe answers YES, then the method continues to step 316. If Joe answers NO, then the method continues to step 312 for contemporaneous monitoring of vehicle 1 movements as Joe travels on his trip. For instance, if Joe is the driver of vehicle 1 and he is going to visit his mother at her home, then he can input or select that information when starting the car and initializing the holographic vehicle communications system and method. Since Joe has visited his mom in the past, the route and travel information is stored in a database of stored files for the computing system of vehicle 1 which can include typical GPS data such as maps, street names, addresses, short cuts, traffic information, travel dates and times, arrival times, prior destinations, prior travel information, traffic patterns and congestion, known destinations/addresses and other data. The database can be resident within vehicle 1 or accessible from a remote server via satellite, bluetooth, the Internet or other wireless communications.

In a first case scenario, Joe is planning to drive from his current location, in this case his house, to a destination being his mother's house along a known route which he has traveled many times and which is stored in the database of the computing system. He answers YES to the query of step 308 and also selects a predetermined route that is retrieved from the database and presented to him as an available route. His route is analyzed in step 316 where the computing system identifies the current location of vehicle 1, for instance using the GPS, and receives the destination as selected by Joe.

Step 304 determines whether any other vehicle (e.g. vehicle 2) is present within a proximate vicinity, i.e. a predetermined range, of vehicle 1. The range can be preset to a value or it can be limited according to the range limitation of a detection device of the system located within vehicle 1. For instance, in this example the detection range is given as a 200 foot radius from the detection device within vehicle 1.

In step 320 a hologram is transmitted of a map of the road ahead of vehicle 1 which includes a representation of Joe's car and projected car movements along the route. A hologram is well-known as a three-dimensional image reproduced from a pattern of interference produced by a split coherent beam of radiation such as a laser. The hologram can be transmitted by any known holographic method or device, such as from a holographic pico-projector, which is capable of providing communications via mid-air projections between vehicles. The holographic vehicle communications system and method utilizes information from the car's GPS mapping system and, even if the GPS system is not currently in display mode to the driver, the mapping information is piped into the holographic vehicle communications system.

The system and method accurately monitors all movement changes of vehicle 1, no matter how subtle, and is not limited to only identifying turns which are indicated upon operation of a directional signal of the vehicle. For example, the system will recognize: (i) actual turns and projected turns of vehicle 1 onto intersecting streets; (ii) subtle movement changes of vehicle 1 while merging from one lane to an adjoining lane over an extended distance (e.g. 200 feet); (iii) vehicle 1 easing out of a driveway from a parked position onto a roadway; (iv) vehicle 1 moving forward in a traffic lane or along a roadway; (iv) vehicle 1 accelerating or slowing in its movement; and (v) vehicle 1 coming to a stop such as at a stop sign or red light.

The system and method accurately determines and presents a hologram for which exact turn or change in direction the vehicle should make. So for example if the vehicle is approaching 3 right hand turns of varying degrees at or near the same intersection, then the hologram will present an image of the intersection with all its turns and will show an arrow to highlight which exact right hand turn (of the three) should be followed on the route. The system and method also can monitor actual vehicular movement changes in real time (see step 312), and/or it can project or estimate vehicular movement changes while traveling to a route and destination previously saved in the database of the computing system.

The system distinguishes all turning options for vehicle 1 by displaying the immediate roadway ahead (e.g. within 1/10 mile ahead) which can include a complex grouping of intersections and possible directional changes for vehicle 1. Consider for example that during Joe's trip to his mother's house he activates his right directional turn signal but there are multiple right turn options coming up within a short distance. There could be a multiple street intersection ahead with two streets off to the left and three different streets veering off to the right whereby all the streets meet together at the same intersection. Moreover, there could be a driveway on the right just a few feet prior to the intersection leading to a shopping center. The holographic vehicle communications system and method will provide a hologram which displays an image of the upcoming roadway at the intersection including all the streets and driveways on the left and the right, and with a holographic arrow(s) clearly showing the intended direction of vehicle 1 turning onto one specific street or driveway at or near the intersection. Holographically displayed arrows could be color coded if desired to indicate specific meanings (e.g. a red colored arrow could indicate a stop ahead whereas a green colored arrow could indicate continued forward progress ahead). The system will present this holographic information in step 320 for viewing by the driver of vehicle 1, and optionally present the same information for viewing by drivers of other nearby vehicles. In this way the clear intention of the projected movement of vehicle 1 is evident to the driver of vehicle 1 and other drivers, rather than the uncertainty of which right turn Joe will take when he activates his right turn signal.

Consider a driver stopped at a red light of a four-way intersection. Uncertainty as to the movement of the vehicle by drivers of surrounding or approaching vehicles when the light turns green can be removed by the method of the holographic vehicle communications system since a holographic image can be projected for other drivers to see which will indicate the intended movement of the vehicle in accordance with directions stored or gathered by the system to move the vehicle towards the desired destination. Thus, even if the driver is unsure of which way to proceed or if he forgets to turn on his directional signal, the stored or programmed information for getting from point A to point B will generate a hologram showing the appropriate vehicle movement for viewing by both the driver of the vehicle and the surrounding drivers as well. This function applies for all vehicular movements along a known route including merging from one lane to another in preparation of an upcoming turn, signaling for a slowdown and upcoming stop at a stop sign, or signaling for caution of an upcoming intersection, light signal or other road condition that may require a change in movement of the vehicle.

The intent of the holographic vehicle communications system and method is to promote safety by providing holographic communications between vehicles within sight of one another, particularly of vehicles which will have intersecting route movements, so that all drivers of vehicles within sight of one another will be able to view and clearly understand the intended vehicular movements of the vehicles around them.

In one example, a hologram can be displayed which shows Joe's car with an arrow going forward and a right turn arrow up ahead on the map at the exact spot of the intended turn. Since Joe is using a stored predetermined route, then the car movements can be automatically presented via holographic display, even if Joe does not manually activate his directional signals. In other words, the program knows when vehicle 1 will be taking a right turn or a left turn. For instance, the hologram can indicate that vehicle 1 will be turning left up ahead by displaying a flashing left-turn signal. Similarly, the hologram can indicate an upcoming right turn by displaying a flashing right turn signal, or the hologram can indicate that vehicle 1 is moving straight forward by displaying a straight arrow.

Various holograms can be transmitted by the computing system and displayed to show the path of vehicle 1 including upcoming vehicle 1 movements such as projected turns, stops, lane merges, or traveling straight ahead. All of these movements by vehicle 1 are known from the predetermined route information to Joe's mother's house. For instance, a hologram showing the vehicle 1 movements can be projected (i) within vehicle 1 for viewing by Joe such as a hologram positioned near the wind shield or dashboard, or (ii) outside of vehicle 1 for viewing by Joe such as a hologram positioned just above the hood of the car, or (iii) outside of vehicle 1 such as being projected near the rear, front or to the sides of vehicle 1 to allow others to view the holographic display.

Step 344 queries whether to change the route or destination for vehicle 1. For instance, while Joe is traveling along the selected predetermined route to his mother's house he may encounter a problem such as a road closure that would require him to change his route. In another example Joe may decide to swing by the local convenience store on route to his mother's house. In yet another example Joe may change his mind en route and decide to visit his mother another time and instead go to his girlfriend's house. If Joe answers NO to changing the route in step 344, then the method would go to step 316 where his travel movements will continue to be monitored and analyzed. On the other hand, if Joe answers YES to changing the route in step 344, then the method returns to step 308 where Joe will be queried to select or input a new destination. Optionally the holographic vehicle communications system and method can time out and shut off if Joe does not respond within a given time frame, e.g. 1 minute.

The default selection in step 344 can be automatic selection by the method to stay with the same route without sending a query or prompt to Joe. A separate explicit action, graphical icon selection or verbal command (e.g. the spoken words "change route") could be required to instigate a route change. Also, the route change query of step 344 could be presented to Joe when the system/method determines during route analysis that Joe has veered away from the movements of the selected predetermined route.

In a second case scenario, Joe is again traveling to his mother's house but this time he's going to use a different route that he's never used before including detours due to road work shutting down some of the roads. This time during initialization in step 300 Joe has indicated to the computing system by input, prompt or selection that he will not be following a predetermined route for vehicle 1, so step 308 determines (based on Joe's inputs) that no specific route is to be followed. The method continues in step 312 whereby the computing system monitors each movement that vehicle 1 makes along the unknown route to Joe's mother's house.

In step 316 the computing system establishes and analyzes the new route which Joe is taking and stores the new route information into the database. Step 304 determines whether another vehicle is located within the range of the detection device. In this example there is no other vehicle detected within 200 feet of vehicle 1, so the method continues to step 320.

In step 320 a mid-air hologram, located for example within his car or outside above the hood, is transmitted of his car movements along the route showing turns, stops, etc. In this case since Joe is using a new, different route, then Joe would manually operate his turn signals as necessary to signal an upcoming turn of vehicle 1 and the system would not have prior knowledge of Joe's navigation. The computing system could also be linked to the brake signal to indicate when the vehicle 1 is being braked in anticipation of a stop at a stop sign or red light.

Step 344 queries whether to change the route or destination for vehicle 1. If Joe answers NO to changing the route in step 344, then the method would go to step 316 where his travel movements will continue to be monitored and analyzed. On the other hand, if Joe answers YES to changing the route in step 344, then the method returns to step 308 where Joe will be queried to select or input a new destination. Optionally the holographic vehicle communications system and method can time out and shut off if Joe does not respond within a given time frame, e.g. 1 minute. Also, the automatic default selection of the system and method continues along the same route and only queries for a route change if explicitly prompted by Joe, or if prompted by vehicular movements that are not part of the known route that was selected.

In a third case scenario, Joe is again traveling to his mother's house along a predetermined route but this time another vehicle, i.e. vehicle 2, is detected in step 304. Other vehicles can be detected by any known detection system which can detect objects within the predetermined range. Upon detection of the presence of vehicle 2, the method continues from step 304 to step 324 in FIG. 3B to receive data related to vehicle 2. Step 328 analyzes the data received with regards to vehicle 2, which includes monitoring the location and movements of vehicle 2. The paths and projected movements of vehicle 1 and vehicle 2 are compared in step 332 and evaluated in step 336. If the evaluation step 336 determines that the paths of vehicle 1 and vehicle 2 will likely intersect, then a warning is generated in step 340 which will be transmitted in holographic fashion as part of the hologram transmitted and displayed for viewing by Joe and others in step 320. The warning could be displayed, for example, as a flashing signal, specific colors, visual depiction of a collision, etc. If the evaluation step 336 determines that the paths of vehicle 1 and vehicle 2 will not intersect, then no warning is issued. The process returns to step 320 where a hologram is transmitted for viewing by Joe and others as previously described.

The complete process of the holographic vehicle communications system and method of FIGS. 3A and 3B ends upon arrival of vehicle 1 to the destination and begins again when a new destination is entered, input or selected into the system by the driver.

The holographic vehicle communications system and method analyzes and provides exact movements and directions of a vehicle 1 and surrounding vehicles within a given range, and then holographically projects in mid-air the movements and directions including exact turning points with clear visibility for the driver of vehicle 1 to see. Moreover, the system and method provides holographic images that can be viewed from surrounding vehicles to vehicle 1 so that they may see a summary of movements of vehicle 1 and other surrounding vehicles with clear visibility in order to see which vehicles will be crossing into their upcoming known path. As more and more vehicles employ the capabilities of this system and method, the roads will become much safer.

Figure 4:
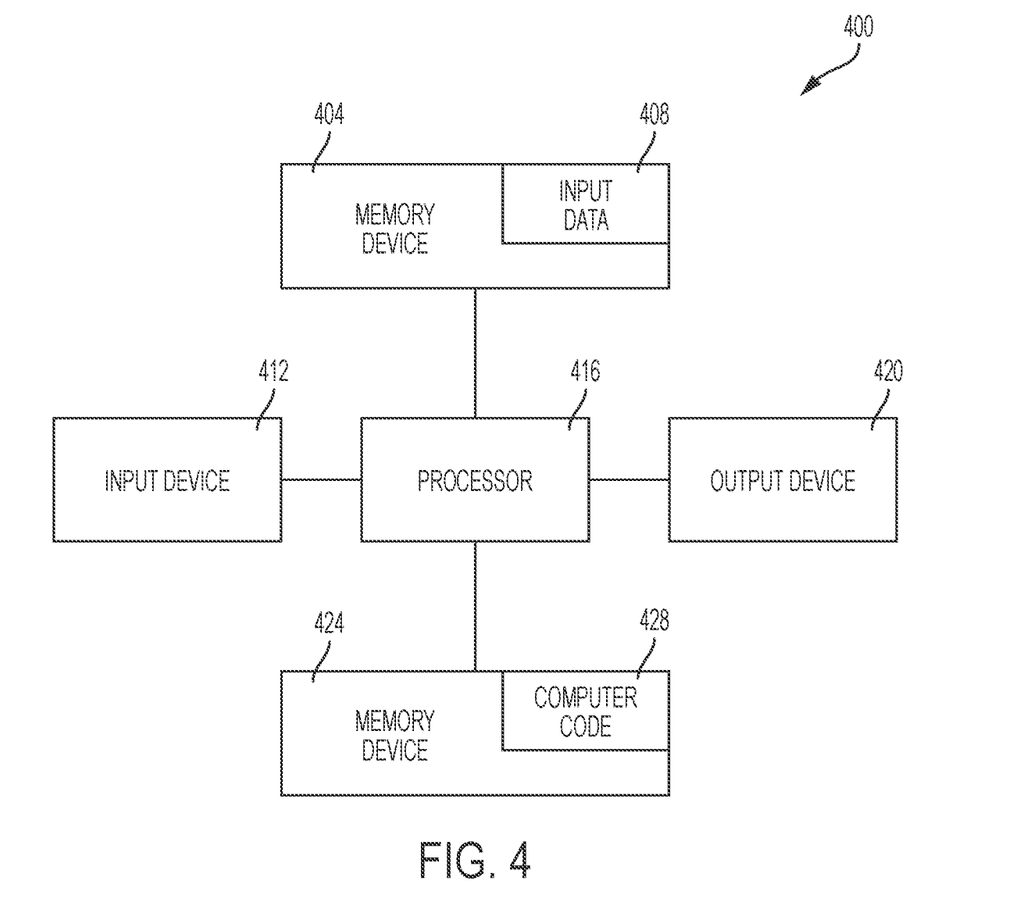
FIG. 4 is a block diagram of a computer system used for implementing the methods of the present invention.

FIG. 4 is a block diagram of a computer system, aka computing device, 400 for implementing search engine optimization based upon most popular search histories in accordance with embodiments of the present invention. The computing device 400 includes a processor 416, an input device 412 coupled to the processor 416, an output device 420 coupled to the processor 416, and memory devices 404 and 424 each coupled to the processor 416. The input device 412 may be, inter alia, a keyboard, a mouse, etc. The output device 420 may be, inter alia, a printer, a plotter, a computer screen, a magnetic tape, a removable hard disk, a floppy disk, etc. The memory devices 404 and 424 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 424 includes a computer code 428 which is a computer program that includes computer-executable instructions.

The computer code 428 includes software or program instructions that may implement an algorithm for implementing methods of the present invention. The processor 416 executes the computer code 428. The memory device 404 includes input data 408. The input data 408 includes input required by the computer code 428. The output device 420 displays output from the computer code 428. Either or both memory devices 404 and 424 (or one or more additional memory devices not shown) may be used as a computer usable storage medium (or program storage device) having a computer readable program embodied therein and/or having other data stored therein, wherein the computer readable program includes the computer code 428.

Generally, a computer program product (or, alternatively, an article of manufacture) of the computer system/device 400 may include the computer usable storage medium (or said program storage device). The processor 416 may represent one or more processors. The memory device 404 and/or the memory device 424 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/ steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring vehicle movement changes, the method comprising:
   analyzing, by a computing system, projected movement changes of a first vehicle traveling along a path in response to (A) said first vehicle path being predetermined and stored in a data storage of the computing system, or (B) navigation of the first vehicle path corresponding to contemporaneous actions by a driver of the first vehicle; and
   transmitting, by the computing system, a hologram indicating a next said projected movement change of the first vehicle in response to the analyzed projected movement changes of the first vehicle.

2. The method of claim 1, further comprising:
   receiving, by the computing system, a signal from a second vehicle indicating a location of the second vehicle and movements along a path of the second vehicle, wherein said second vehicle is determined to be located within a proximate vicinity of the first vehicle;
   analyzing, by the computing system, the location of the second vehicle and the path of the second vehicle in response to the received signal from the second vehicle; and
   transmitting, by the computing system, holographic displays for viewing by the driver of the first vehicle, the path and projected movement changes of the first vehicle and the location and the path of the second vehicle.

3. The method of claim 2, further comprising:
   comparing, by the computing system, the location and the path of the second vehicle with the path and projected movement changes of the first vehicle;
   evaluating in response to the comparing step, by the computing system, whether paths of the first vehicle and the second vehicle will intersect; and
   transmitting in response to the evaluating step, by the computing system, a holographic warning of a projected intersection of paths of the first vehicle and the second vehicle for viewing by the driver of the first vehicle.

4. The method of claim 2, wherein the proximate vicinity is defined as 200 feet.

5. The method of claim 1, wherein the hologram indicating the next said projected movement change of the first vehicle is transmitted, by the computing system, either (i) inside of the first vehicle for viewing by the driver of the first vehicle, or (ii) outside of the first vehicle for viewing by the driver of the first vehicle, or (iii) outside of the first vehicle for viewing by the driver of the first vehicle and drivers of other vehicles.

6. The method of claim 1, wherein the hologram indicating the next said projected movement change of the first vehicle is simultaneously transmitted, by the computing system, both inside and outside of the first vehicle.

7. The method of claim 1, further comprising:
   learning, by the computing system, previously traveled routes of the first vehicle by storing the previously traveled routes in the data storage of the computing system.

8. A computer program product, comprising one or more computer readable hardware storage devices having computer readable program code stored therein, said program code containing instructions executable by a computing device to implement a method for monitoring vehicle movement changes, the method comprising:
   analyzing, by a computing system, projected movement changes of a first vehicle traveling along a path in response to (A) said first vehicle path being predetermined and stored in a data storage of the computing system, or (B) navigation of the first vehicle path corresponding to contemporaneous actions by a driver of the first vehicle; and transmitting, by the computing system, a hologram indicating a next said projected movement change of the first vehicle in response to the analyzed projected movement changes of the first vehicle.

9. The computer program product of claim 8, wherein the method further comprises:

receiving, by the computing system, a signal from a second vehicle indicating a location of the second vehicle and movements along a path of the second vehicle, wherein said second vehicle is determined to be located within a proximate vicinity of the first vehicle;

analyzing, by the computing system, the location of the second vehicle and the path of the second vehicle in response to the received signal from the second vehicle; and transmitting, by the computing system, holographic displays for viewing by the driver of the first vehicle, the path and projected movement changes of the first vehicle and the location and the path of the second vehicle.

10. The computer program product of claim 9, wherein the method further comprises:

comparing, by the computing system, the location and the path of the second vehicle with the path and projected movement changes of the first vehicle;

evaluating in response to the comparing step, by the computing system, whether paths of the first vehicle and the second vehicle will intersect; and transmitting in response to the evaluating step, by the computing system, a holographic warning of a projected intersection of paths of the first vehicle and the second vehicle for viewing by the driver of the first vehicle.

11. The computer program product of claim 9, wherein the proximate vicinity is defined as 200 feet.

12. The computer program product of claim 8, wherein the hologram indicating the next said projected movement change of the first vehicle is transmitted, by the computing system, either (i) inside of the first vehicle for viewing by the driver of the first vehicle, or (ii) outside of the first vehicle for viewing by the driver of the first vehicle, or (iii) outside of the first vehicle for viewing by the driver of the first vehicle and drivers of other vehicles.

13. The computer program product of claim 8, wherein the hologram indicating the next said projected movement change of the first vehicle is simultaneously transmitted, by the computing system, both inside and outside of the first vehicle.

14. The computer program product of claim 8, wherein the method further comprises: learning, by the computing system, previously traveled routes of the first vehicle by storing the previously traveled routes in the data storage of the computing system.

15. A system, comprising a computing device, said computing device comprising one or more processors, one or more memories, and one or more computer readable hardware storage devices, said one or more hardware storage devices containing program code executable by the one or more processors via the one or more memories to implement a method for monitoring vehicle movement changes, the method comprising:

analyzing, by a computing system, projected movement changes of a first vehicle traveling along a path in response to (A) said first vehicle path being predetermined and stored in a data storage of the computing system, or (B) navigation of the first vehicle path corresponding to contemporaneous actions by a driver of the first vehicle; and transmitting, by the computing system, a hologram indicating a next said projected movement change of the first vehicle in response to the analyzed projected movement changes of the first vehicle.

16. The system of claim 15, wherein the method further comprises:

receiving, by the computing system, a signal from a second vehicle indicating a location of the second vehicle and movements along a path of the second vehicle, wherein said second vehicle is determined to be located within a proximate vicinity of the first vehicle;

analyzing, by the computing system, the location of the second vehicle and the path of the second vehicle in response to the received signal from the second vehicle; and transmitting, by the computing system, holographic displays for viewing by the driver of the first vehicle, the path and projected movement changes of the first vehicle and the location and the path of the second vehicle.

17. The system of claim 16, wherein the method further comprises:

comparing, by the computing system, the location and the path of the second vehicle with the path and projected movement changes of the first vehicle;

evaluating in response to the comparing step, by the computing system, whether paths of the first vehicle and the second vehicle will intersect; and transmitting in response to the evaluating step, by the computing system, a holographic warning of a projected intersection of paths of the first vehicle and the second vehicle for viewing by the driver of the first vehicle.

18. The system of claim 15, wherein the hologram indicating the next said projected movement change of the first vehicle is transmitted, by the computing system, either (i) inside of the first vehicle for viewing by the driver of the first vehicle, or (ii) outside of the first vehicle for viewing by the driver of the first vehicle, or (iii) outside of the first vehicle for viewing by the driver of the first vehicle and drivers of other vehicles.

19. The system of claim 15, wherein the hologram indicating the next said projected movement change of the first vehicle is simultaneously transmitted, by the computing system, both inside and outside of the first vehicle.

20. The system of claim 15, wherein the method further comprises:

learning, by the computing system, previously traveled routes of the first vehicle by storing the previously traveled routes in the data storage of the computing system.

* * * * *